United States Patent
Ma et al.

(10) Patent No.: US 8,797,980 B2
(45) Date of Patent: Aug. 5, 2014

(54) METHOD, APPARATUS AND SYSTEM FOR TRANSMITTING INFORMATION

(75) Inventors: Jie Ma, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/305,138

(22) Filed: Nov. 28, 2011

(65) Prior Publication Data

US 2012/0069811 A1   Mar. 22, 2012

Related U.S. Application Data

(63) Continuation of application No. 12/769,809, filed on Apr. 29, 2010, which is a continuation of application No. PCT/CN2008/072841, filed on Oct. 27, 2008.

(30) Foreign Application Priority Data

Oct. 31, 2007   (CN) .......................... 2007 1 0124236

(51) Int. Cl.
*H04W 4/00* (2009.01)

(52) U.S. Cl.
USPC ........................................................ 370/329

(58) Field of Classification Search
None
See application file for complete search history.

(56) References Cited

U.S. PATENT DOCUMENTS

| | | |
|---|---|---|
| 6,757,293 B1 | 6/2004 | Chuah et al. |
| 7,711,365 B2 | 5/2010 | Nakamata |
| 7,797,012 B1 | 9/2010 | Longoni et al. |
| 7,864,722 B2 | 1/2011 | Yi et al. |
| 7,894,390 B2 | 2/2011 | Nakamata et al. |
| 7,894,444 B2 | 2/2011 | Lohr et al. |
| 2002/0045448 A1 | 4/2002 | Park |
| 2003/0016698 A1 | 1/2003 | Chang et al. |
| 2003/0223360 A1 | 12/2003 | Makoto |
| 2004/0017789 A1 | 1/2004 | Hoeynck |
| 2004/0160925 A1 | 8/2004 | Heo et al. |
| 2005/0053035 A1* | 3/2005 | Kwak et al. ................... 370/331 |
| 2005/0063347 A1 | 3/2005 | Sarkkinen et al. |
| 2005/0254511 A1 | 11/2005 | Kekki |
| 2006/0019671 A1 | 1/2006 | Chemiakina |
| 2006/0114877 A1 | 6/2006 | Heo et al. |

(Continued)

FOREIGN PATENT DOCUMENTS

| | | |
|---|---|---|
| CN | 1451251 A | 10/2003 |
| CN | 1472901 A | 2/2004 |

(Continued)

OTHER PUBLICATIONS

LG Electronics, "Discussion on RACH enhancements," R2-074165, 3GPP TSGRAN WG2 #59 bis (Oct. 8-12, 2007, Shanghai, China). 2 Pages total.

(Continued)

*Primary Examiner* — Chi Pham
*Assistant Examiner* — Kouroush Mohebbi
(74) *Attorney, Agent, or Firm* — Slater & Matsil, L.L.P.

(57) ABSTRACT

A method for transmitting information includes by a NodeB, receiving a message for setting up/reconfiguring a shared Enhanced Dedicated Channel (E-DCH) transmission channel from a Radio Network Controller (RNC); and setting up the shared E-DCH transmission channel according to parameters in the message, and exchanging information with the RNC through an established shared E-DCH transmission bearer.

14 Claims, 2 Drawing Sheets

(56) References Cited

U.S. PATENT DOCUMENTS

| | | |
|---|---|---|
| 2006/0156184 A1 | 7/2006 | Kim et al. |
| 2006/0223567 A1 | 10/2006 | Kwak et al. |
| 2007/0010270 A1 | 1/2007 | Dillon |
| 2007/0042785 A1 | 2/2007 | Nakamata |
| 2007/0047486 A1 | 3/2007 | Lee |
| 2007/0140123 A1 | 6/2007 | Fukui |
| 2007/0258402 A1* | 11/2007 | Nakamata et al. ............ 370/329 |
| 2008/0085719 A1 | 4/2008 | Kuchibhotla |
| 2008/0108311 A1 | 5/2008 | Shindo |
| 2008/0123585 A1 | 5/2008 | Granzow et al. |
| 2008/0182594 A1* | 7/2008 | Flore et al. .................... 455/458 |
| 2008/0253300 A1 | 10/2008 | Wakabayashi et al. |
| 2008/0273610 A1 | 11/2008 | Malladi et al. |
| 2008/0311923 A1 | 12/2008 | Petrovic |
| 2009/0022134 A1 | 1/2009 | Chun et al. |
| 2009/0088185 A1 | 4/2009 | Beale |
| 2009/0135771 A1 | 5/2009 | Pani |
| 2009/0185540 A1 | 7/2009 | Pelletier et al. |
| 2009/0268676 A1 | 10/2009 | Wiggard et al. |
| 2012/0069811 A1 | 3/2012 | Ma et al. |

FOREIGN PATENT DOCUMENTS

| | | |
|---|---|---|
| CN | 1534915 A | 10/2004 |
| CN | 1627844 A | 6/2005 |
| CN | 1645961 A | 7/2005 |
| CN | 1687244 A | 10/2005 |
| CN | 1790971 A | 6/2006 |
| CN | 1867161 A | 11/2006 |
| CN | 1889534 A | 1/2007 |
| CN | 1943144 A | 4/2007 |
| CN | 101006688 A | 7/2007 |
| CN | 101030810 A | 9/2007 |
| CN | 101031094 A | 9/2007 |
| CN | 101203048 A | 6/2008 |
| EP | 1689127 A1 | 8/2006 |
| EP | 1737262 A1 | 12/2006 |
| EP | 1755355 A1 | 2/2007 |
| EP | 1796335 A1 | 6/2007 |
| EP | 1838057 A2 | 9/2007 |
| EP | 1841265 A2 | 10/2007 |
| EP | 2207276 A1 | 7/2010 |
| JP | 2000228787 A | 8/2000 |
| WO | 01/72080 A1 | 9/2001 |
| WO | 2004/028041 A1 | 4/2004 |
| WO | 2006/081874 A1 | 8/2006 |
| WO | 2007/003707 A1 | 1/2007 |
| WO | 2007/073683 A1 | 7/2007 |
| WO | 2009055536 A2 | 4/2009 |

OTHER PUBLICATIONS

3rd Generation Partnership Project, Technical Specification Group Radio Access Network; UTRAN Iub interface Node B Application Part (NBAP) Signaling (3GPP TS 25.433) (Release 7, Version 7.6.0) (Sep. 2007). 971 pages total.
Extended European Search Report in corresponding European Application No. 08848009.0 (Mar. 3, 2011), 10 pages total.
International Search Report in corresponding PCT Application No. PCT/CN2008/072796 (Feb. 5, 2009),5 pages total.
Written Opinion in corresponding PCT Application No. PCT/CN2008/072796 (Feb. 5, 2009), 4 pages total.
International Search Report in corresponding PCT Application No. PCT/CN2008/072841 (Feb. 5, 2009), 6 pages total.
Written Opinion in corresponding PCT Application No. PCT/CN2008/072841 (Feb. 5, 2009), 4 pages total.
1st Office Action in corresponding Chinese Application No. 200710124235.1 (Nov. 13, 2009), and English translation thereof, 7 pages total.
Rejection Decision in corresponding Chinese Application No. 200710124235.1 (Jun. 12, 2010), and English translation thereof, 8 pages total.
Re-examination Decision in corresponding Chinese Application No. 200710124235.1 (Jul. 21, 2011), and English translation thereof, 12 pages total.
"R2-073254—Further discussion on enhanced Cell_FACH in REL8," 3GPP TSG-RAN WG2 Meeting #59, Aug. 20-24, 2007, NSN and Nokia, Athens, Greece, 3 pages total.
"R2-071927—Enhanced CELL_FACH state with E-DCH," 3GPP TSG-RAN WG3 Meeting #57bis, Oct. 8-11, 2007, NSN and Nokia, Sophia Antipolis, France, 2 pages total.
"3GPP TS 25.433—3rd Generation Partnership Project; Technical Specification Group Radio Access Network; UTRAN Iub interface Node B Application Part (NBAP) signaling (Release 6)," Mar. 2007, Version 6.13.0, 3rd Generation Partnership Project, Valbonne, France, 759 pages total.
3GPP TS 25.827—3rd Generation Partnership Project; 1.28Mcps TDD Enhanced Uplink, Physical Layer Aspects (Release 7), Version 7.0.0, 3rd Generation Partnership Project, Valbonne, France, 31 pages.
"3GPP TS 23.401—3 rd Generation Partnership Project: Technical Specification Group Services and System Aspects; GPRS enhancements for E-UTRAN access (Release 80," May 2007, Version 1.0.0, 3rd Generation Partnership Project, Valbonne, France, 50 pages total.
"TD S2-075726—Globally Unique Temporary Identities," 3GPP TSG SA VVG2, Nov. 12-16, 2007, 31d Generation Partnership Project, Valbonne, France, 4 pages total.
"S2-073255—Discussion on the structure of S-TIVISI," 3GPP TSG SA VVG2 Meeting #59, Aug. 27-31, 2007, 31d Generation Partnership Project, Helsinki, Finland, 3 pages total.
First office action issued in corresponding U.S. Appl. No. 12/769,809 , dated May 1, 2012,total 31 pages.
First office action issued in corresponding U.S. Appl. No. 13/305,138 ,dated Feb. 16, 2012,total 12 pages.
First office action issued in corresponding U.S. Appl. No. 12/771,863 ,dated Sep. 23, 2011,total 21 pages.
Third office action issued in corresponding U.S. Appl. No. 13/114,209 ,dated Apr. 18, 2012,total 16 pages.
First office action issued in corresponding U.S. Appl. No. 13/114,209, dated Sep. 22, 2011,total 14 pages.
Second office action issued in corresponding U.S. Appl. No. 13/114,209 ,dated Nov. 4, 2011,total 10 pages.
Office action issued in corresponding U.S. Appl. No. 12/769,809,dated Jul. 9, 2013,total 16 pages.
Second office action issued in corresponding U.S. Appl. No. 12/771,863 ,dated Jun. 27, 2012, 18 pages total.
Office action issued in corresponding European application No. 08848009.0,dated Sep. 9, 2013,total 7 pages.
Office action issued in corresponding to U.S. Appl. No. 13/114,209,dated Nov. 14, 2012,total 12 pages.
Search report issued in corresponding European application No. 08848301.1,dated Jun. 16, 2013,total 10 pages.
3GPP TSG-RAN WG2 Meeting#59bis R2-074010,"Enhanced Random Access with E-DCH",NSN,Nokia,Oct. 2007,total 2 pages.
3GPP TSG-RAN WG2 Meeting#60 R3-081424,"On Resource Allocation",Nokia Siemens Networks,Nokia,May 2008, total 2 pages.
3GPP TS 25.427 V7.5.0,3rd Generation Partnership Project;Technical Specification Group Radio Access Network; UTRAN Iub/Iur interface user plane protocol for DCH data streams(Release 7),Sep. 2007,total 44 pages.
Office action issued in corresponding to U.S. Appl. No. 13/114,209,dated May 31,2013,total 16 pages.
Chinese Office Action received in Application No. 201210020408.6 mailed Feb. 11, 2014, 6 pages.
Chinese Search Report received in Application No. 2012100204086 mailed Jan. 27, 2014, 2 pages.
Office action issued in corresponding to U.S. Appl. No. 12/769,809,dated Feb. 12, 2013,total 15 pages.

* cited by examiner

METHOD, APPARATUS AND SYSTEM FOR TRANSMITTING INFORMATION

This application is a continuation of U.S. patent application Ser. No. 12/769,809, filed on Apr. 29, 2010, which is a continuation of International Application No PCT/CN2008/072841, filed on Oct. 27, 2008, which claims priority to Chinese Patent Application No. 200710124236.6, filed on Oct. 31, 2007, all of which are hereby incorporated by reference in their entireties.

TECHNICAL FIELD

The present invention relates to mobile communication technologies, and in particular, to a method, apparatus, and system for transmitting information.

BACKGROUND

A mobile communication system includes a User Equipment (UE), a base station, and a radio network control device. For ease of description, it is assumed that the base station is a NodeB of Universal Mobile Telecommunications System, and that the radio network control device is a Radio Network Controller (RNC) hereunder. The channel between the UE and the NodeB and the channel between the NodeB and the RNC are Random Access Channels (RACHs).

To enhance the data transmission rate between the UE and the NodeB, a solution is put forward in the industry: using High Speed Downlink Packet Access (HSDPA) in the downlink common channel, thus making the theoretical downlink transmission rate as high as 100 Kbps. However, the downlink transmission rate is affected by the uplink transmission rate. For example, uplink transmission is currently performed on a shared RACH, which leads to slow uplink response and affects the downlink transmission rate.

To solve the problem, another solution is put forward in the industry: using High Speed Uplink Packet Access (HSUPA) to implement random access. This solution requires the UE to use an Enhanced Dedicated Channel (E-DCH) transmission channel to transmit the specific messages in the uplink transmission at random access. That is, an E-DCH should be used between the UE and the NodeB. This solution increases the speed of exchanging information between the UE and the NodeB massively.

During implementing of the present invention, the inventor finds at least the following problems in the prior art.

To increase the speed of transmitting the data sent by the UE in the uplink direction between the RNC and the NodeB, an E-DCH transmission channel may also be used between the RNC and the NodeB. Because the UE data quantity is small and intermittent, if a dedicated E-DCH channel is used between the RNC and the NodeB, resources are wasted drastically.

The channel between the RNC and the NodeB is port-based. This channel is different from the air interface based channel between the UE and the NodeB, and the method for allocating an E-DCH transmission channel between the UE and the NodeB at random access is not applicable to allocation of the channel between the RNC and the NodeB.

SUMMARY OF THE INVENTION

The embodiments of the present invention provide a method for transmitting information to save the channel resources between the RNC and the NodeB while speeding up the information transmission between the RNC and the NodeB. In addition, the embodiments of the present invention provide an apparatus and system for transmitting information.

The objectives of the present invention are fulfilled through the following technical solution.

A method for transmitting information is provided in an embodiment of the present invention. The method includes receiving by a NodeB, a message for setting up/reconfiguring a shared Enhanced Dedicated Channel (E-DCH) transmission channel from a Radio Network Controller (RNC) and setting up by the NodeB, the shared E-DCH transmission channel according to parameters in the message, and exchanging information with the RNC through an established shared E-DCH transmission bearer.

A system for transmitting information is provided in an embodiment of the present invention.

An RNC in the system is configured to send a message for setting up/reconfiguring a shared E-DCH transmission channel to a NodeB.

The NodeB in the system is configured to set up the shared E-DCH transmission channel according to the setup/reconfiguration message sent by the RNC, and exchange information with the RNC through an established shared E-DCH transmission bearer.

A NodeB for transmitting information is provided in an embodiment of the present invention.

The NodeB is configured to: receive a message for setting up/reconfiguring a shared E-DCH transmission channel from an RNC, set up the shared E-DCH transmission channel according to the parameters in the message, and exchange information with the RNC through the an established E-DCH transmission bearer.

Compared with the prior art, the embodiments of the present invention use the NodeB to receive the message for setting up/reconfiguring a shared E-DCH transmission channel from the RNC, and set up the shared E-DCH transmission channel based on the message. Afterward, through the shared E-DCH transmission channel, the NodeB exchanges information with the RNC. Therefore, the NodeB and the RNC can share the E-DCH transmission bearer, thus saving the channel resources between the NodeB and the RNC while speeding up the information transmission between the RNC and the NodeB.

DETAILED DESCRIPTION OF ILLUSTRATIVE EMBODIMENTS

To make the technical solution, objectives and merits of the present invention clearer, the following describes the embodiments of the present invention in detail with reference to some accompanying drawings.

Figure 1:
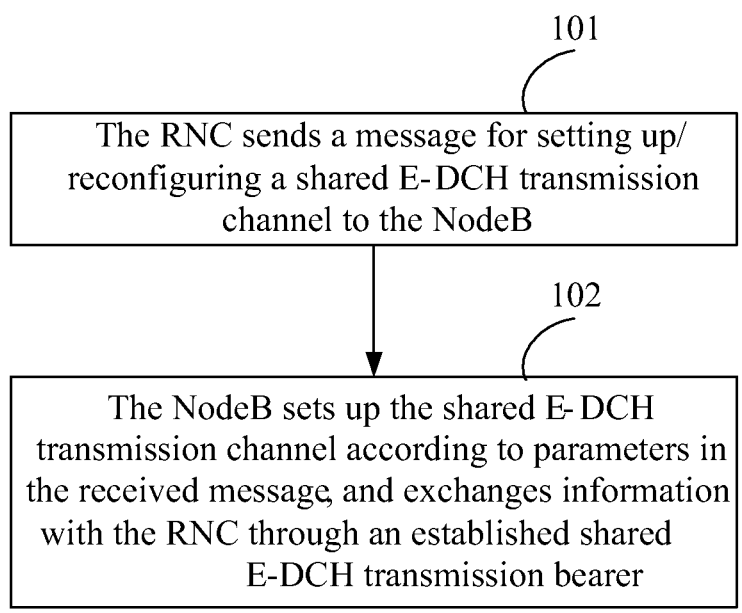
FIG. 1 is a sequence diagram of configuring a shared E-DCH transmission channel between an RNC and a NodeB according to an embodiment of the present invention.

As shown in FIG. 1, the process of configuring a shared E-DCH transmission channel between an RNC and a NodeB according to an embodiment of the present invention includes the following content.

Step 101: The RNC sends a message for setting up/reconfiguring a shared E-DCH transmission channel to the NodeB, requesting the NodeB to set up an E-DCH transmission channel.

It is assumed herein that the setup/reconfiguration message sent by the RNC to the NodeB is a setup/reconfiguration request.

The RNC needs to send a request to the NodeB, notifying the parameters required for channel setup/reconfiguration. For example, the parameters may include: the signature list and/or the relevant physical layer channel parameters used when the UE performs random access through the E-DCH, and/or the relevant physical layer channel parameters; and the parameters may further include one or more of these parameters: the physical layer parameters required when the UE performs random access through the E-DCH, transmission channel parameters required when the UE performs random access through the E-DCH, or transmission bearer parameters required when the UE performs random access through the E-DCH, or may further include one or all of the above two types of parameters. The parameters may be sent through a new message; or the parameters are added into a message of the existing process, which means the parameters are sent through the existing process.

If the RNC sends the signature list used when the UE performs random access through the E-DCH to the NodeB, the RNC may send the signature list in many modes. This embodiment provides several modes: (1) A table is stipulated in the protocol, and a serial number of the table is assigned and sent; or (2) a signature sequence is configured and sent; or (3) the signature list is sent in the mode like Preamble Signatures in the traditional Physical Random Access Channel (PRACH). These sending modes may be performed in the process of setting up the common transmission channel.

If the RNC sends the physical layer channel parameters required when the UE performs random access through the E-DCH to the NodeB, the RNC may send the parameters in many modes. This embodiment provides the specific processing modes for the RNC to notify the NodeB to assign the relevant resources through configuration of the channel such as the Arrest Indication Channel (AICH), High Speed-DSCH-related Shared Control Channel (HS-SCCH), and High Speed Physical Downlink Shared Channel (HS-PDSCH). The detailed modes are as follows.

(1) An Arrest Indication (AI) is added into an AICH sent to the NodeB, indicating that the AICH may be used at the time of performing random access through the E-DCH. In this case, the AICH may be modified in the common transmission setup process.

(2) The second mode is specific to the HS-SCCH. In this mode, the HS-SCCH sent to the NodeB may carry at least one of these items: physical-layer parameters, HS-SCCH format number, and HS-SCCH time sequence relation. In this case, the HS-SCCH may be modified in the process of reconfiguring the physical shared channel. The physical-layer parameters may be channelized codes and power. The power may be the maximum transmit power and/or initial transmit power; for the HS-SCCH format number, the current HS-SCCH comes in three formats, and the specific format needs to be indicated; the HS-SCCH time sequence relation may be a contrast between the HS-SCCH and an absolute time sequence, for example, an offset from the AICH or Primary Common Control Physical Channel (P-CCPCH), measured in timeslots or 256 chips.

(3) The third mode is specific to the HS-PDSCH. In this mode, the HS-PDSCH sent to the NodeB may be added at least one of these items: physical-layer parameters, HS-PDSCH time sequence relation, and transmission channel parameters. In this mode, the HS-PDSCH may be modified in the process of setting up the common transmission channel. Besides, the physical-layer parameters may include at least one of these items: channelized code, modulation mode, power, and TB size; the HS-PDSCH time sequence relation may be a contrast between an HS-PDSCH and an absolute time sequence, for example, an offset from an AICH or P-CCPCH, measured in timeslots or 256 chips; the transmission channel parameters include an indication of the MAC format, specifically including MAC-hs, MAC-ehs in DPA enhancement, or a newly defined format.

If the RNC sends the relevant E-DCH physical-layer parameters required when the UE performs random access through the E-DCH, transmission channel parameters required when the UE performs random access through the E-DCH, and the transmission bearer parameters required when the UE performs random access through the E-DCH, etc., to the NodeB, the RNC may send the parameters in many modes as the same.

The E-DCH physical-layer parameters may include the parameters in the following Table 1, and such parameters may be added in the process of setting up the common transmission channel.

TABLE 1

E-DPCH Information
>Maximum Set of E-DPDCHs
>Puncture Limit
>E-TFCS Information
>E-TTI
>E-DPCCH Power Offset
>HARQ Info for E-DCH
E-DCH FDD Information
F-DPCH Information
>Power Offset Information
>>PO2
>FDD TPC DL Step Size
>Limited Power Increase
>Inner Loop DL PC Status The transmission channel parameters may include the parameters in the following Table 2. Specifically, an indication may be added into the shared physical channel reconfiguration to indicate that the parameters can be used at the time of performing random access through the E-DCH. Alternatively, the parameters are directly added into the process of setting up the common transmission channel.

TABLE 2

E-AGCH And E-RGCH/E-HICH FDD Scrambling Code
E-AGCH Code FDD Information
E-RGCH/E-HICH Code FDD Information The transmission bearer may include the optional parameters in the following Table 3. These optional parameters may be added in the process of setting up the common transmission channel.

TABLE 3

| IE/GroupName | Presence | Range | IE Type and Reference | Semantics Description |
|---|---|---|---|---|
| RL Specific E-DCH Information | | 1 ... <maxnoo fEDCHMA CdFlows> | | |

TABLE 3-continued

| IE/GroupName | Presence | Range | IE Type and Reference | Semantics Description |
|---|---|---|---|---|
| >Binding ID | O | | 9.2.1.4 | Shall be ignored if bearer establishment with ALCAP. |
| >Transport Layer Address | O | | 9.2.1.63 | Shall be ignored if bearer establishment with ALCAP. |
| >>>>Common Transport Channel ID | O | | 9.2.1.14 | |
| >>>>Transport Format Set | O | | 9.2.1.59 | For the UL. |
| >>>>TNL QoS | O | | 9.2.1.58A | Shall be ignored if bearer establishment with ALCAP. |
| E-AGCH Power Offset | O | | 9.2.2.13Id | |
| E-RGCH Power Offset | O | | 9.2.2.13Ie | |
| E-HICH Power Offset | O | | 9.2.2.13If | |

Step 102: The NodeB sets up the shared E-DCH transmission channel according to parameters in the received message, and exchanges information with the RNC through an established shared E-DCH transmission bearer.

The NodeB may return a channel setup/reconfiguration response to the RNC, notifying the information about the established E-DCH transmission channel.

The NodeB sets up the corresponding shared E-DCH transmission channel according to the parameters sent by the RNC, and returns the information about the established channel to the RNC. Specifically, the transmission-layer address and/or Binding ID is notified to the RNC. Alternatively, other relevant parameters of the E-DCH transmission channel may be notified to the RNC.

Moreover, after the shared E-DCH transmission channel is set up, if the NodeB needs to send UE information to the RNC, the UE ID needs to be notified to the RNC. Specifically, after receiving the information sent by the UE, the NodeB also needs to add the UE ID into the received information, with a view to modifying the data to new E-DCH data, or with a view to modifying the E-DCH FP frame corresponding to the data to the FP frame that carries the UE ID.

The modified FP frame is shown in the following Table 4.

TABLE 4

| Header crc | | FT |
|---|---|---|
| Header CRC cont | | FSN |
| Spare | | Numbers of subframe |
| | CFN | |
| | UEid1 | |
| | UEid1 | |
| | Ueid 2 | |
| | Ueid 2 | |
| | Ueid n | |
| | Ueid n | |
| Ue 1 | Nof HARQ Retransm | 1st subframe No. |
| N of MAC-es PDUs | | First DDI |
| First DDI | | First N |
| | Last DDI | Last N |
| Last N cont | | PAd |
| Ue 1 | Nof HARQ Retransm | Last subframe No. |
| N of MAC-es PDUs | | First DDI |
| First DDI | | First N |
| | Last DDI | Last N |
| Last N cont | | PAd |
| Ue 1 | Nof HARQ Retransm | Last subframe No. |
| N of MAC-es PDUs | | First DDI |
| First DDI | | First N |
| | Last DDI | Last N |
| Last N cont | | PAd |
| New IE flag | | |
| First MAC-es PDU of 1st subframe of UE1 | | |
| Last MAC-es PDU of Last subframe of UE1 | | |
| Last MAC-es PDU of Last subframe of UEn | | |
| Payload CRC | | |
| Payload CRC cont | | |

In the foregoing solution which uses a shared E-DCH transmission channel to transmit data to the RNC, it is necessary to modify the processing logic of the RNC so that the RNC can resolve the UE ID. Specifically, the MAC-es entity may be modified accordingly. Nevertheless, the modification is based on the precondition that the entity corresponding to the resolved UE ID in the RNC is a MAC-es entity. If the entity corresponding to the UE ID is another entity, the entity needs to be modified accordingly.

The foregoing embodiment reveals that: Random access can also be performed between the RNC and the NodeB through an E-DCH, thus saving the channel resources between the RNC and the NodeB.

Figure 2:
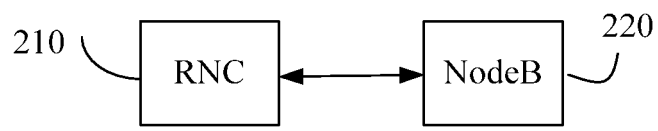
FIG. 2 shows a structure of a system according to an embodiment of the present invention.
Figure 3:
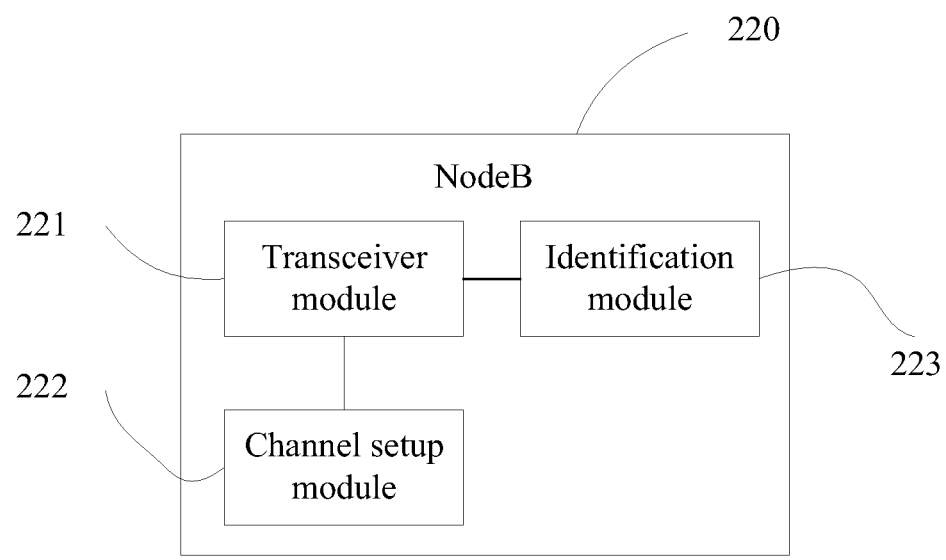
FIG. 3 shows a structure of a NodeB according to an embodiment of the present invention.

As shown in FIG. 2, the system provided in an embodiment of the present invention includes an RNC 210 and a NodeB 220.

The RNC 210 needs to send a message for setting up/reconfiguring a shared E-DCH transmission channel to the NodeB 220.

The NodeB 220 needs to set up the shared E-DCH transmission channel according to parameters in the message, and exchange information with the RNC through an established shared E-DCH transmission bearer.

The NodeB 220 is further configured to return the information about the established shared E-DCH transmission channel to the RNC 210.

Afterward, information may be transmitted between the NodeB 220 and the RNC 210 through the established shared E-DCH transmission bearer.

When the RNC 210 sends the setup/reconfiguration request, the setup/reconfiguration request sent by the RNC 210 may carry a signature list used when the UE performs random access through the E-DCH, relevant physical-layer channel parameters required when the UE performs random access through the E-DCH, relevant physical-layer parameters required when the UE performs random access through the E-DCH, transmission channel parameters, or transmission bearer parameters, or any combination thereof.

The RNC 210 sends a setup/reconfiguration request and returns the information about the established shared E-DCH transmission channel to the NodeB 220, which is detailed above and not described further.

After the shared E-DCH transmission bearer channel is set up, if the NodeB 220 needs to send UE information to the RNC 210, the UE ID needs to be notified to the RNC 210. Specifically, after receiving the information sent by the UE, the NodeB 220 also needs to add the UE ID into the received information, with a view to modifying the data to new E-DCH data, or with a view to modifying the E-DCH FP frame corresponding to the data to the FP frame that carries the UE ID.

Accordingly, the RNC 210 needs to resolve the received information to obtain the UE ID. For example, for the new E-DCH data and E-DCH FP frame, the MAC-es entity in the RNC 210 needs to be modified. The implementation is detailed above, and is not described further.

The foregoing method and system embodiments reveal that: In the apparatus embodiment herein, the NodeB 220 needs to set up a shared E-DCH transmission channel according to the parameters in the message sent by the RNC 220, and may be further configured to return a channel setup/reconfiguration response to the RNC 210 to indicate the information about the established shared E-DCH transmission channel.

Accordingly, the RNC 210 needs to send a request for setting up/reconfiguring a shared E-DCH transmission channel to the NodeB 220.

After the shared E-DCH transmission channel is set up between the NodeB 220 and the RNC 210, the NodeB 220 may be further configured to: add an UE ID into the information transmitted by the UE through the shared E-DCH transmission channel and convert the data in the information into the E-DCH data that carries the UE ID, or convert the information into an FP frame that carries the UE ID, and send the modified information to the RNC 210 through the shared E-DCH transmission bearer.

Specifically, the NodeB 220 for transmitting information may include a transceiver module 221 that is configured to receive a message for setting up/reconfiguring a shared E-DCH transmission channel from the RNC 210; and a channel setup module 222 that is configured to set up the shared E-DCH transmission channel according to parameters in the message, and to control the transceiver module 221 to exchange information with the RNC 210 through an established shared E-DCH transmission bearer.

The NodeB may further include an identification module 223 that is configured to add a UE ID into the information received from the UE, to modify the data in the information to new E-DCH data or to modify the E-DCH FP frame corresponding to the data to the FP frame that carries the UE ID, and to control the transceiver module 221 to send the modified information to the RNC 210 through the shared E-DCH transmission channel.

The foregoing embodiment reveals that random access may also be performed between the RNC and the NodeB through an E-DCH, thus saving the channel resources between the RNC and the NodeB.

The NodeB and RNC in the embodiments of the present invention may be replaced with other devices of equivalent functions. These alternatives also fall within the scope of protection of the present invention Based on the descriptions of the preceding embodiments, those skilled in the art may understand that the present invention may be implemented by hardware only or by software and a necessary universal hardware platform. The technical solution of the present invention may be embodied by a software product which may be stored in a nonvolatile storage medium. The storage medium can be a Compact Disk Read-Only Memory (CD-ROM), a USB disk, or a mobile hard disk. The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for transmitting information, comprising:
   receiving, by a NodeB, a message for setting up a shared enhanced dedicated channel (E-DCH) from a radio network controller (RNC), wherein the shared E-DCH is an E-DCH shared among a plurality of user equipments (UEs) and seized by one of the UEs via competition; and
   setting up, by the NodeB, the shared E-DCH according to the message;
   wherein the message comprises the following parameters that are needed when a UE performs a random access procedure through the shared E-DCH:
   a signature list;
   a relevant E-DCH physical layer parameter;
   a transmission channel parameter; and
   a transmission bearer parameter;
   and wherein the signature list is transmitted to the NodeB by the RNC in a same manner as transmitting a preamble signature in a physical random access channel (PRACH).

2. The method of claim 1, further comprising:
   returning, by the NodeB, information about the shared E-DCH to the RNC, wherein the returned information comprises at least one of a transmission layer address and a binding ID.

3. The method of claim 1, further comprising:
   converting, by the NodeB, data sent by a UE into a frame protocol (FP) frame carrying a UE identification (ID) of the UE, and
   sending, by the NodeB, the FP frame to the RNC through the shared E-DCH.

4. The method of claim 1, wherein the signature list comprises an index in a table in a protocol, the index corresponding to the signature list.

5. The method of claim 1, wherein
   the relevant E-DCH physical layer parameter comprises at least one of: E-DPCH information, E-DCH FDD Information and F-DPCH Information.

6. The method of claim 5, wherein the E-DPCH information comprises at least one of the following items: a maximum set of an E-DPDCH, a puncture limit, E-TFCS Information, E-TTI, an E-DPCC power offset and HARQ Info for E-DCH.

7. The method of claim 1, wherein the transmission bearer parameter comprises at least one of:
   a binding identification (ID),
   a transport layer address,
   a common transport channel ID,
   a transport format set, and
   TNL QoS.

8. A system for transmitting information, comprising:
   a radio network controller (RNC); and
   a NodeB;
   wherein the RNC is configured to send a message for setting up a shared enhanced dedicated channel (E-DCH) to the NodeB, wherein the shared E-DCH is an E-DCH shared among a plurality of user equipments (UEs) and seized by one of the UEs via competition; and
   the NodeB is configured to set up the shared E-DCH according to the message sent by the RNC;
   wherein the message comprises the following parameters that are needed when a UE performs a random access procedure through the shared E-DCH:
   a signature list, which is transmitted to the NodeB by the RNC in a same manner as transmitting a preamble signature in a physical random access channel (PRACH), a relevant physical layer parameter,
a transmission channel parameter, and
a transmission bearer parameter.

9. The system of claim 8, wherein:
the NodeB is further configured to obtain an E-DCH frame protocol (FP) frame that carries a UE identification (ID) of the UE and corresponds to data received from the UE, and to send the E-DCH FP frame, which carries the UE ID, through the shared E-DCH to the RNC; and
the RNC is further configured to receive the E-DCH FP frame sent by the NodeB and resolve the received E-DCH FP frame to obtain the UE ID.

10. A NodeB, comprising:
a transceiver, configured to receive a message for setting up a shared enhanced dedicated channel (E-DCH) from a radio network controller (RNC), wherein the shared E-DCH is an E-DCH shared among a plurality of user equipments (UEs) and seized by one of the UEs via competition; and
a channel setup unit, configured to set up the shared E-DCH according to the message received by the transceiver;
wherein the message comprises the following parameters that are needed when a UE performs a random access procedure through the shared E-DCH:
a signature list, which is transmitted to the NodeB by the RNC in a same manner as transmitting a preamble signature in a physical random access channel (PRACH),
a relevant physical layer parameter,
a transmission channel parameter, and
a transmission bearer parameter.

11. The NodeB of claim 10, further comprising:
an identification unit, configured to obtain an E-DCH frame protocol (FP) frame that carries a UE ID of the UE and corresponds to data received from the UE, and to control the transceiver to send the E-DCH FP frame to the RNC through the shared E-DCH.

12. The NodeB of claim 10, wherein the relevant E-DCH physical layer parameter comprises at least one of: E-DPCH information, E-DCH FDD Information and F-DPCH Information.

13. The NodeB of claim 12, wherein the E-DPCH information comprises at least one of a maximum set of an E-DPDCH, a puncture limit, E-TFCS Information, E-TTI, an E-DPCC power offset and HARQ Info for E-DCH.

14. The NodeB of claim 10, wherein the transmission bearer parameter comprises at least one of a binding ID, a transport layer address, a common transport channel ID, a transport format set and TNL QoS.

* * * * *